No. 723,645. PATENTED MAR. 24, 1903.
W. E. BROWN.
JAR CLOSURE.
APPLICATION FILED SEPT. 24, 1902.
NO MODEL.

UNITED STATES PATENT OFFICE.

WILLIAM E. BROWN, OF LOS ANGELES, CALIFORNIA, ASSIGNOR TO B-W AUTOMATIC JAR & BOTTLE COMPANY, OF LOS ANGELES, CALIFORNIA, A CORPORATION OF CALIFORNIA.

JAR-CLOSURE.

SPECIFICATION forming part of Letters Patent No. 723,645, dated March 24, 1903.

Application filed September 24, 1902. Serial No. 124,686. (No model.)

*To all whom it may concern:*

Be it known that I, WILLIAM E. BROWN, of Los Angeles, in the county of Los Angeles and State of California, have invented certain new and useful Improvements in Jar-Closures; and I do hereby declare the following to be a full, clear, and exact description of the invention, such as will enable others skilled in the art to which it appertains to make and use the same.

In the use of that class of bottles, jars, and other vessels employing a stopper fitting within the neck of the vessel and held therein by a gasket-ring it has been found difficult to provide means for accommodating a gasket sufficiently large in cross-section to securely seal the vessel and yet permit of ready insertion and removal of the stopper.

The object of this invention is to provide simple and highly-efficient means whereby this difficulty may be overcome, such provision comprising the improvement in the construction of the groove for the gasket, as hereinafter more fully set forth, and particularly pointed out in the claims.

Figure 1:
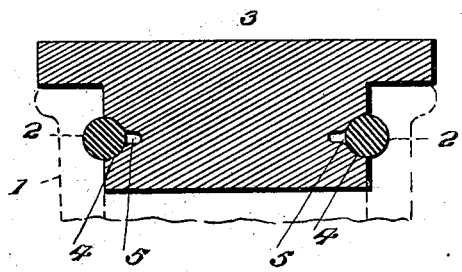
Figure 2:
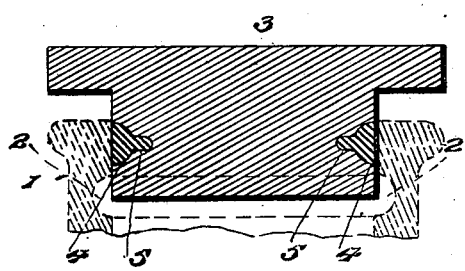

In the accompanying drawings, Figure 1 is a view in vertical section of a stopper constructed in accordance with my invention. Fig. 2 is a similar view showing the stopper partly inserted in a jar.

Referring to the drawings, 1 designates a portion of a jar or vessel designed to contain liquids, preserved fruit, or the like. The neck of the jar is provided with an internal annular groove 2, designed to accommodate a gasket-ring carried by the stopper, as usual in this class of vessels.

The stopper 3 is formed with a cylindrical portion of slightly-less diameter than the opening in the bottle-neck. 4 designates an external annular groove, approximately semicircular or V shape in cross-section, formed in the cylindrical portion of the stopper. At its vertex or point of greatest depth this groove opens into a recess or subchamber 5, the office of which is to permit a rubber ring or other flexible gasket carried by and fitting snugly within groove 4 to be pressed partially into the recess or subchamber upon the protruding portion of the gasket contacting with the bottle-neck above groove 2 while the stopper is being inserted, as shown in Fig. 2. When the stopper is finally forced home, the grooves 2 and 4 are in alinement, and the gasket instantly recedes from the recess or subchamber and completely fills the space formed by grooves 2 and 4.

I preferably employ a gasket-ring circular in cross-section and of size corresponding to the grooves 2 and 4, so as to completely fill the space formed thereby when the stopper is inserted, thus securing a perfect seal. In practice the gasket is placed in groove 4 and the stopper inserted by a twisting or screw-like motion.

The cross-sectional area of the recess or subchamber 5 is sufficiently less than that of groove 4 that upon the gasket, which normally fills the latter, being forced into the recess or subchamber there will be no tendency of its remaining therein once the grooves 2 and 4 are in alinement.

The advantages of my invention are apparent. It will be noted that I am enabled to employ a gasket-ring of such size as to completely seal the jar and yet permit of the ready insertion and removal of the stopper and that the cylindrical portion of the latter may be of a diameter but a slight degree less than that of the neck-opening.

While I have specified a gasket circular in cross-section and grooves of corresponding formation, yet it is obvious that they may be of any preferred shape, the essential feature being the gasket of such size as to completely fill the two grooves when the latter are in alinement. It has heretofore been impossible to employ a gasket-ring of such diameter for the want of space to permit of the necessary compression in forcing the stopper home. In consequence the gasket has necessarily been of smaller size than is requisite to the attainment of good results or the cylindrical portion of the stopper has been reduced to such an extent that a perfect seal could not be obtained.

I claim as my invention—

1. The combination with a vessel having an annular groove in its neck, of a stopper having a corresponding groove designed to aline therewith, a gasket-ring designed to fill the space formed by such grooves, and a chamber designed to accommodate a portion of such gasket while compressed during the insertion or removal of the stopper, as set forth.

2. The combination with a vessel having an inner annular groove, of a stopper for such vessel having an external annular groove, and a subchamber formed in the groove of the stopper, for the purpose set forth, and a gasket-ring carried in the groove of the stopper.

3. The combination with a vessel having an inner annular groove, of a stopper having an external annular groove, a gasket-ring corresponding in cross-section to the space formed by such grooves, and a subchamber formed in the groove of the stopper, as and for the purpose set forth.

4. The combination with a vessel having a groove, of a stopper for such vessel also having a groove, a gasket-ring designed to fill the space formed by said grooves when the latter are in alinement, and a subchamber opening from the groove of the stopper and into which the gasket is designed to enter while the stopper is being inserted and withdrawn, substantially as set forth.

5. The herein-described stopper for vessels having a groove, and a recess or subchamber at the point of greatest depth of such groove, said subchamber being of less cross-sectional diameter than said groove, in combination with a gasket, and a vessel having a groove in its neck, said gasket being designed to fill the space formed by said grooves when in alinement with each other, as and for the purpose set forth.

In testimony whereof I have signed this specification in the presence of two subscribing witnesses.

WILLIAM E. BROWN.

Witnesses:
D. D. WASHBURN,
GEO. E. REID.